US012706025B2

(12) United States Patent
Kim et al.

(10) Patent No.: US 12,706,025 B2

(45) Date of Patent: Aug. 11, 2026

(54) GATE DRIVER AND DISPLAY DEVICE INCLUDING THE SAME

(71) Applicant: Samsung Display Co., LTD., Yongin-si (KR)

(72) Inventors: Taegyun Kim, Yongin-si (KR); Jaeyong Jang, Yongin-si (KR); Minjae Jeong, Yongin-si (KR)

(73) Assignee: Samsung Display Co., Ltd, Yongin-si (KR)

( * ) Notice: Subject to any disclaimer, the term of this patent is extended or adjusted under 35 U.S.C. 154(b) by 0 days.

(21) Appl. No.: 18/968,674

(22) Filed: Dec. 4, 2024

(65) Prior Publication Data

US 2025/0239211 A1 Jul. 24, 2025

(30) Foreign Application Priority Data

Jan. 23, 2024 (KR) ........................ 10-2024-0009867
Apr. 12, 2024 (KR) ........................ 10-2024-0049169

(51) Int. Cl.
*G09G 3/32* (2016.01)
*G09G 3/3266* (2016.01)

(52) U.S. Cl.
CPC ............ *G09G 3/32* (2013.01); *G09G 3/3266* (2013.01); *G09G 2310/0267* (2013.01); *G09G 2310/0275* (2013.01); *G09G 2330/021* (2013.01)

(58) Field of Classification Search
CPC ................... G09G 3/32; G09G 3/3266; G09G 2310/0267; G09G 2310/0275; G09G 2330/021
See application file for complete search history.

(56) References Cited

U.S. PATENT DOCUMENTS

| | | | | |
|---|---|---|---|---|
| 8,175,215 | B2 * | 5/2012 | Liu | G11C 19/28 377/79 |
| 8,422,621 | B2 * | 4/2013 | Jang | G09G 3/3677 377/79 |
| 9,947,269 | B2 * | 4/2018 | Jung | G09G 3/3266 |
| 10,074,329 | B2 * | 9/2018 | Jang | G11C 19/28 |
| 10,157,683 | B2 * | 12/2018 | Jang | H10D 30/6755 |
| 10,467,938 | B1 * | 11/2019 | Xiang | G09G 3/3677 |
| 10,679,564 | B2 * | 6/2020 | Jang | G09G 3/3266 |
| 10,726,778 | B2 * | 7/2020 | Xiang | G09G 3/3266 |
| 10,769,977 | B2 * | 9/2020 | Xiang | G09G 3/20 |
| 11,062,657 | B2 * | 7/2021 | Bae | G11C 19/287 |
| 11,081,058 | B2 * | 8/2021 | Feng | G09G 3/3266 |

(Continued)

FOREIGN PATENT DOCUMENTS

| | | |
|---|---|---|
| KR | 10-2023-0129108 | 9/2023 |
| KR | 10-2024-0068866 | 5/2024 |

*Primary Examiner* — Michael J Jansen, II

(74) *Attorney, Agent, or Firm* — Womble Bond Dickinson (US) LLP

(57) ABSTRACT

A gate driver includes: a first transistor configured to transmit an input signal to a control node; a third transistor including a gate connected to the control node, a first terminal configured to receive a power voltage having a level higher than a level of a second low gate voltage, and a second terminal connected to an inverting control node; a fifth transistor configured to output the second low gate voltage as a gate signal in response to a signal of the control node; and a sixth transistor configured to output a high gate voltage as the gate signal in response to a signal of the inverting control node.

18 Claims, 8 Drawing Sheets

(56) References Cited

U.S. PATENT DOCUMENTS 11,238,808 B2 * 2/2022 Lee .................. G09G 3/3291
11,462,173 B2 * 10/2022 Kwon .................. G09G 3/3266
11,468,841 B2 * 10/2022 Byun .................. G09G 3/3266
11,580,906 B2 * 2/2023 Wang .................. G09G 3/3233
11,640,793 B2 * 5/2023 Kim .................. G09G 3/3233
345/213
11,645,981 B2 * 5/2023 Noh .................. G11C 19/28
345/213
11,657,761 B2 * 5/2023 In .................. G09G 3/3275
345/211
11,721,268 B2 * 8/2023 Lai .................. G09G 3/2092
345/204
12,159,590 B2 * 12/2024 Yuan .................. G09G 3/3225
12,380,859 B2 * 8/2025 Shin .................. G09G 3/3266
12,475,856 B2 * 11/2025 Cha .................. G09G 3/3233
2010/0226473 A1 * 9/2010 Liu .................. G11C 19/28
377/79
2012/0269316 A1 * 10/2012 Jang .................. G09G 3/3677
377/64
2016/0253976 A1 * 9/2016 Jang .................. G09G 3/3677
345/208
2016/0322116 A1 * 11/2016 Jang .................. H10D 30/6755
2016/0351122 A1 * 12/2016 Jung .................. G09G 3/3233
2018/0138256 A1 5/2018 Han et al.
2018/0366067 A1 * 12/2018 Jang .................. G09G 3/3266
2019/0325800 A1 * 10/2019 Xiang .................. G11C 19/287
2019/0325815 A1 * 10/2019 Xiang .................. G11C 19/28
2019/0325829 A1 * 10/2019 Bae .................. G09G 3/3266
2020/0051507 A1 * 2/2020 Feng .................. G11C 19/28
2021/0035504 A1 * 2/2021 Lee .................. G09G 3/3266
2021/0118368 A1 * 4/2021 In .................. G09G 3/3275
2021/0280130 A1 * 9/2021 Wang .................. G09G 3/3233
2021/0335263 A1 * 10/2021 Byun .................. G09G 5/10
2021/0366402 A1 11/2021 In et al.
2021/0375212 A1 * 12/2021 Kwon .................. G09G 3/3266
2022/0076611 A1 * 3/2022 Lai .................. G09G 3/2092
2022/0148511 A1 * 5/2022 Kim .................. G09G 3/3266
2022/0223109 A1 7/2022 Lai et al.
2023/0009494 A1 * 1/2023 Noh .................. G09G 3/3233
2024/0135882 A1 * 4/2024 Yuan .................. G09G 3/3258
2025/0148977 A1 * 5/2025 Lee .................. G09G 3/3233
2025/0218387 A1 * 7/2025 Shin .................. G09G 3/3266
2025/0232731 A1 * 7/2025 Cha .................. G09G 3/3233

* cited by examiner

GATE DRIVER AND DISPLAY DEVICE INCLUDING THE SAME

CROSS-REFERENCE TO RELATED APPLICATION(S)

The present application claims priority to and the benefit of Korean Patent Application No. 10-2024-0009867, filed on Jan. 23, 2024, and Korean Patent Application No. 10-2024-0049169, filed on Apr. 12, 2024, in the Korean Intellectual Property Office, the entire disclosures of each of which are incorporated herein by reference.

BACKGROUND

1. Field

Aspects of some embodiments relate to a display device.

2. Description of the Related Art

A display device may include a display panel that displays images, a gate driver that provides gate signals to the display panel, and a data driver that provides data voltages to the display panel. The gate driver may include transistors and capacitors for generating the gate signals.

During a manufacturing or use process of the gate driver, a threshold voltage of a transistor included in the gate driver may be shifted. When a shift margin of the threshold voltage of the transistor may not be sufficiently secured, the transistor may not normally operate, and accordingly, a reliability of the gate driver may decrease.

The above information disclosed in this Background section is only for enhancement of understanding of the background and therefore the information discussed in this Background section does not necessarily constitute prior art.

SUMMARY

Aspects of some embodiments relate to a display device. For example, aspects of some embodiments relate to a gate driver with relatively low power consumption and a display device including the gate driver.

Aspects of some embodiments include a gate driver with relatively improved reliability.

Aspects of some embodiments include a display device including a gate driver with relatively improved reliability.

A gate driver according to some embodiments may include a first transistor which transmits an input signal to a control node, a third transistor including a gate connected to the control node, a first terminal which receives a power voltage having a level higher than a level of a second low gate voltage, and a second terminal connected to an inverting control node, a fifth transistor which outputs the second low gate voltage as a gate signal in response to a signal of the control node, and a sixth transistor which outputs a high gate voltage as the gate signal in response to a signal of the inverting control node.

According to some embodiments, the gate driver may further include a seventh transistor which outputs a first low gate voltage having a level higher than the level of the second low gate voltage as a carry signal in response to the signal of the control node, and an eighth transistor which outputs the high gate voltage as the carry signal in response to the signal of the inverting control node.

According to some embodiments, the power voltage may be the first low gate voltage.

According to some embodiments, the power voltage may be a third low gate voltage having a level different from the level of the first low gate voltage.

According to some embodiments, the level of the third low gate voltage may be higher than the level of the first low gate voltage.

According to some embodiments, the third transistor may be an NMOS transistor.

According to some embodiments, the first transistor may include a gate which receives a clock signal, a first terminal which receives the input signal, and a second terminal connected to the control node.

According to some embodiments, the gate driver may further include a fourth transistor including a gate connected to the control node, a first terminal which receives the high gate voltage, and a second terminal connected to the inverting control node.

According to some embodiments, the gate driver may further include a second transistor including a gate which receives the second low gate voltage, a first terminal connected to a first control node, and a second terminal connected to a second control node. The control node may be divided into the first control node and the second control node.

According to some embodiments, the gate driver may further include a first capacitor including a first terminal connected to a gate output terminal from which the gate signal is output and a second terminal connected to the control node.

According to some embodiments, the gate driver may further include a second capacitor including a first terminal connected to the inverting control node and a second terminal which receives the high gate voltage.

A display device according to some embodiments may include a display panel including a plurality of pixels, a gate driver which provides a gate signal to each of the pixels, and a data driver which provides a data voltage to each of the pixels. The gate driver may include a first transistor which transmits an input signal to a control node, a third transistor including a gate connected to the control node, a first terminal which receives a power voltage having a level higher than a level of a second low gate voltage, and a second terminal connected to an inverting control node, a fifth transistor which outputs the second low gate voltage as the gate signal in response to a signal of the control node, and a sixth transistor which outputs a high gate voltage as the gate signal in response to a signal of the inverting control node.

According to some embodiments, the gate driver may further include a seventh transistor which outputs a first low gate voltage having a level higher than the level of the second low gate voltage as a carry signal in response to the signal of the control node, and an eighth transistor which outputs the high gate voltage as the carry signal in response to the signal of the inverting control node.

According to some embodiments, the power voltage may be the first low gate voltage.

According to some embodiments, the power voltage may be a third low gate voltage having a level different from the level of the first low gate voltage.

According to some embodiments, the third transistor may be an NMOS transistor.

According to some embodiments, each of the pixels may include a light emitting element, a first pixel transistor which controls a driving current flowing through the light emitting element, a second pixel transistor which transmits the data voltage to a gate of the first pixel transistor in response to a write gate signal, a third pixel transistor which compensates a threshold voltage of the first pixel transistor in response to a compensation gate signal, a fourth pixel transistor which transmits a first initialization voltage to the gate of the first pixel transistor in response to an initialization gate signal, a fifth pixel transistor which blocks a connection between a first terminal of the first pixel transistor and a first pixel voltage in response to an emission signal, a sixth pixel transistor which blocks a connection between a second terminal of the first pixel transistor and a second pixel voltage in response to the emission signal, a seventh pixel transistor which provides a second initialization voltage to an anode of the light emitting element in response to a bypass gate signal, and a storage capacitor which stores a signal of the gate of the first pixel transistor.

According to some embodiments, the gate signal may be the compensation gate signal.

According to some embodiments, the gate signal may be the initialization gate signal.

According to some embodiments, the gate signal may be the emission signal.

In the gate driver according to some embodiments, the power voltage (the first low gate voltage or the third low gate voltage) having a level higher than a level of the second low gate voltage may be applied to the first terminal of the third transistor, so that a negative shift margin of a threshold voltage of the third transistor may increase. Accordingly, the reliability of the gate driver may be relatively improved.

The display device according to some embodiments may include the gate driver with relatively improved reliability, so that a display quality of the display device may be relatively improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
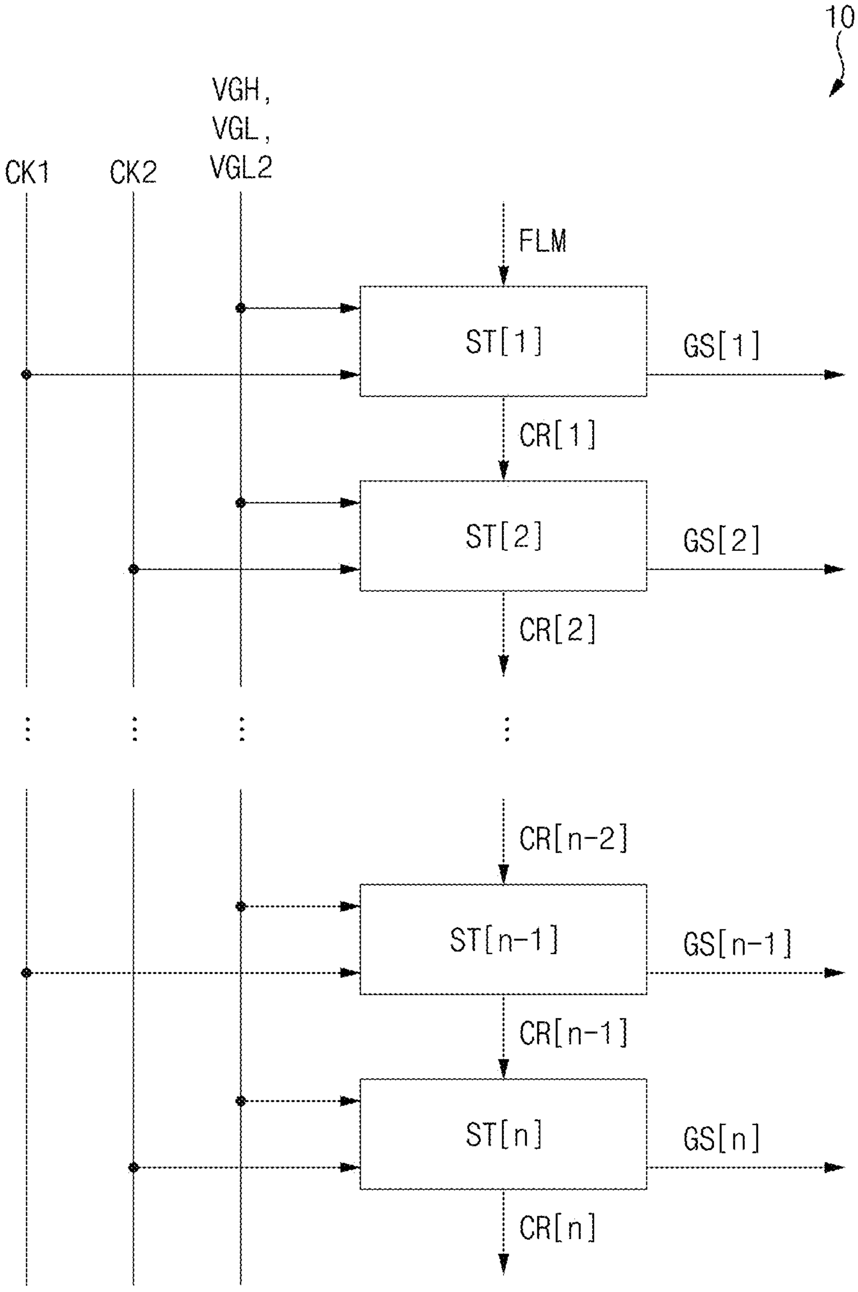
FIG. 1 is a block diagram showing a gate driver according to some embodiments.

Hereinafter, a gate driver and a display device according to some embodiments of the present disclosure will be described in more detail with reference to the accompanying drawings. The same or similar reference numerals will be used for the same elements in the accompanying drawings.

FIG. 1 is a block diagram showing a gate driver 10 according to some embodiments.

Referring to FIG. 1, the gate driver 10 may receive a first clock signal CK1, a second clock signal CK2, a high gate voltage VGH, a first low gate voltage VGL, a second low gate voltage VGL2, and a gate start signal FLM, and may output first to $n^{th}$ (n is a natural number greater than 1) gate signals GS[1], GS[2], . . . , GS[n−1], and GS[n] and first to $n^{th}$ carry signals CR[1], CR[2], . . . , CR[n−1], and CR[n]. The second clock signal CK2 may be a signal obtained by shifting the first clock signal CK1 by a half period (e.g., 1 horizontal time period) of the first clock signal CK1. The high gate voltage VGH may be a turn-off voltage of a p-channel metal oxide semiconductor ("PMOS") transistor and a turn-on voltage of an n-channel metal oxide semiconductor ("NMOS") transistor. For example, a level of the high gate voltage VGH may be 6.5 volts (V) (or about 6.5V). Each of the first low gate voltage VGL and the second low gate voltage VGL2 may be a turn-on voltage of the PMOS transistor and a turn-off voltage of the NMOS transistor. A level of the first low gate voltage VGL may be higher than a level of the second low gate voltage VGL2. For example, the level of the first low gate voltage VGL may be −7V (or about −7V), and the level of the second low gate voltage VGL2 may be −10V (or about −10V).

The gate driver 10 may include first to $n^{th}$ stages ST[1], ST[2], . . . , ST[n−1], and ST[n].

Each of the first to $n^{th}$ stages ST[1], ST[2], . . . , ST[n−1], and ST[n] may receive the high gate voltage VGH, the first low gate voltage VGL, and the second low gate voltage VGL2. Each of the first to $n^{th}$ stages ST[1], ST[2], . . . , ST[n−1], and ST[n] may receive the first clock signal CK1 or the second clock signal CK2. According to some embodiments, each of odd-numbered stages ST[1], . . . , ST[n−1] may receive the first clock signal CK1, and each of even-numbered stages ST[2], . . . , ST[n] may receive the second clock signal CK2. The first stage ST[1] may receive the gate start signal FLM, and each of the second to $n^{th}$ stages ST[2], . . . , ST[n−1], and ST[n] may receive a carry signal output from the previous stage. The first to $n^{th}$ stages ST[1], ST[2], . . . , ST[n−1], and ST[n] may output the first to $n^{th}$ gate signals GS[1], GS[2].], . . . , GS[n−1], and GS[n] and the first to $n^{th}$ carry signals CR[1], CR[2], . . . , CR[n−1], and CR[n], respectively.

Figure 2:
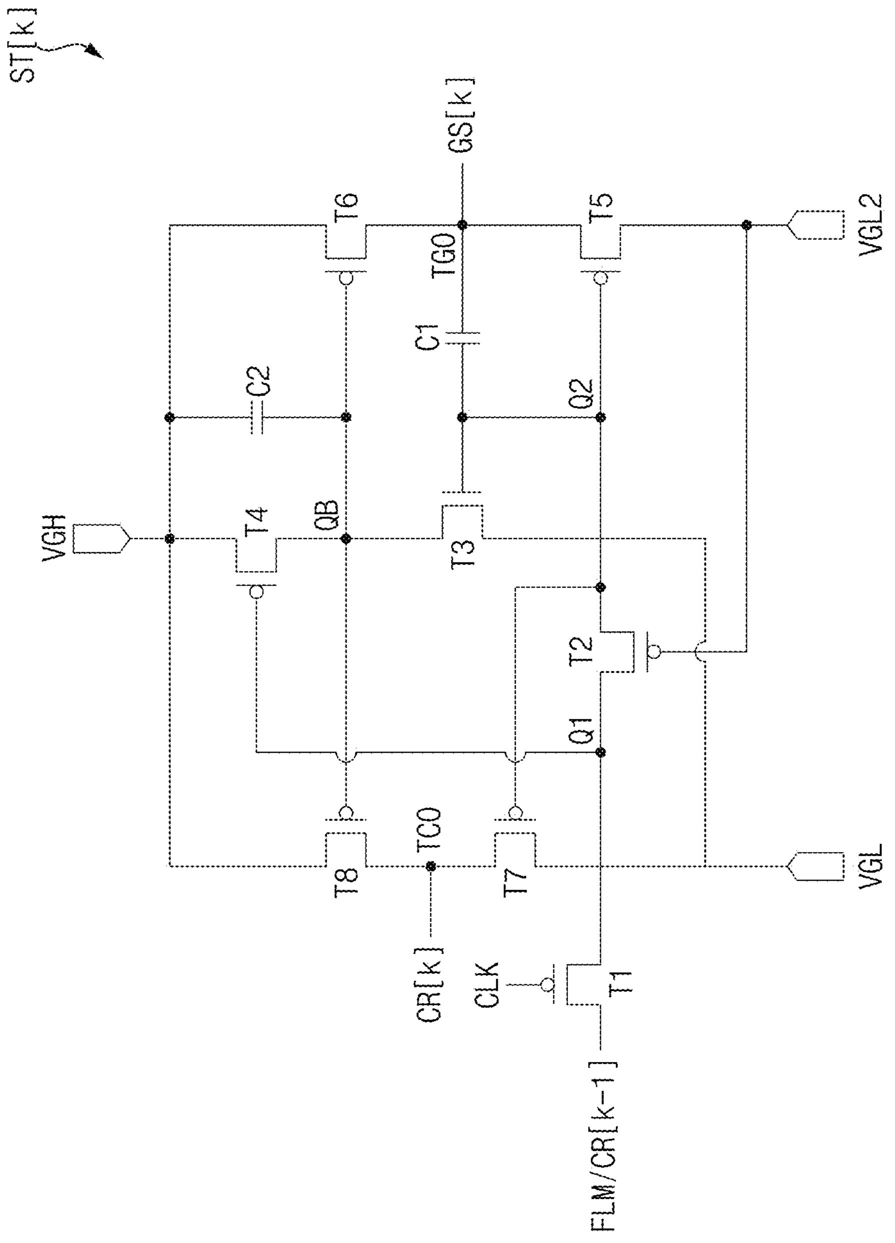
FIG. 2 is a circuit diagram showing a $k^{th}$ stage of FIG. 1.

FIG. 2 is a circuit diagram showing a $k^{th}$ stage ST[k] of FIG. 1. Although FIG. 2 illustrates various components in a $k^{th}$ stage ST[k] according to some embodiments, embodiments according to the present disclosure are not limited thereto, and according to some embodiments, the $k^{th}$ stage ST[k] may include additional components or fewer components without departing from the spirit and scope of embodiments according to the present disclosure.

Referring to FIGS. 1 and 2, the $k^{th}$ (k is a natural number greater than or equal to 1 and less than or equal to n) stage ST[k] may receive an input signal (FLM/CR[k−1]), a clock signal CLK, the high gate voltage VGH, the first low gate voltage VGL, and the second low gate voltage VGL2, and may output a $k^{th}$ gate signal GS[k] and a $k^{th}$ carry signal CR[k]. When the $k^{th}$ stage ST[k] is the first stage ST[1], the input signal FLM/CR[k−1] may be the gate start signal FLM. When the $k^{th}$ stage ST[k] is one of the second to $n^{th}$ stages ST[2], . . . , ST[n−1], and ST[n], the input signal FLM/CR[k−1] may be a k−1th carry signal CR[k−1] output from a k−1th stage. When the $k^{th}$ stage ST[k] is one of the odd-numbered stages ST[1], . . . , ST[n−1], the clock signal CLK may be the first clock signal CK1. When the $k^{th}$ stage ST[k] is one of the even-numbered stages ST[2], . . . , ST[n], the clock signal CLK may be the second clock signal CK2.

The $k^{th}$ stage ST[k] may include a first transistor T1, a second transistor T2, a third transistor T3, a fourth transistor T4, a fifth transistor T5, a sixth transistor T6, a seventh transistor T7, an eighth transistor T8, a first capacitor C1, and a second capacitor C2. However, the number of transistors included in the $k^{th}$ stage ST[k] and the number of capacitors included in the $k^{th}$ stage ST[k] are not limited thereto.

The first transistor T1 may transmit the input signal FLM/CR[k−1] to a control node Q1 and Q2. The control node Q1 and Q2 may be divided into a first control node Q1 and a second control node Q2. According to some embodiments, the first transistor T1 may include a gate receiving the clock signal CLK, a first terminal receiving the input signal FLM/CR[k−1], and a second terminal connected to the first control node Q1.

The second transistor T2 may include a gate receiving the second low gate voltage VGL2, a first terminal connected to the first control node Q1, and a second terminal connected to the second control node Q2. The second transistor T2 may be an always on transistor ("AOT").

The third transistor T3 may transmit a power voltage to an inverting control node QB in response to a signal of the control node Q1 and Q2. According to some embodiments, the third transistor T3 may include a gate connected to the second control node Q2, a first terminal receiving the power voltage, and a second terminal connected to the inverting control node QB.

A level of the power voltage may be higher than the level of the second low gate voltage VGL2. According to some embodiments, the power voltage may be the first low gate voltage VGL.

The fourth transistor T4 may transmit the high gate voltage VGH to the inverting control node QB in response to the signal of the control node Q1 and Q2. According to some embodiments, the fourth transistor T4 may include a gate connected to the first control node Q1, a first terminal receiving the high gate voltage VGH, and a second terminal connected to the inverting control node QB.

The fifth transistor T5 may output the second low gate voltage VGL2 as the gate signal GS[k] in response to the signal of the control node Q1 and Q2. According to some embodiments, the fifth transistor T5 may include a gate connected to the second control node Q2, a first terminal receiving the second low gate voltage VGL2, and a second terminal connected to a gate output terminal TGO from which the gate signal GS[k] is output.

The sixth transistor T6 may output the high gate voltage VGH as the gate signal GS[k] in response to a signal of the inverting control node QB. According to some embodiments, the sixth transistor T6 may include a gate connected to the inverting control node QB, a first terminal receiving the high gate voltage VGH, and a second terminal connected to the gate output terminal TGO.

The seventh transistor T7 may output the first low gate voltage VGL as the carry signal CR[k] in response to the signal of the control node Q1 and Q2. According to some embodiments, the seventh transistor T7 may include a gate connected to the second control node Q2, a first terminal receiving the first low gate voltage VGL, and a second terminal connected to a carry output terminal TCO from which the carry signal CR[k] is output. The first low gate voltage VGL having a level higher than the level of the second low gate voltage VGL2 may be applied to the first terminal of the seventh transistor T7, so that a power consumption by the seventh transistor T7 may relatively decrease, and a power consumption of the gate driver 10 may relatively decrease.

The eighth transistor T8 may output the high gate voltage VGH as the carry signal CR[k] in response to the signal of the inverting control node QB. According to some embodiments, the eighth transistor T8 may include a gate connected to the inverting control node QB, a first terminal receiving the high gate voltage VGH, and a second terminal connected to the carry output terminal TCO.

According to some embodiments, each of the first transistor T1, the second transistor T2, the fourth transistor T4, the fifth transistor T5, the sixth transistor T6, the seventh transistor T7, and the eighth transistor T8 may be the PMOS transistor, and the third transistor T3 may be the NMOS transistor. However, embodiments according to the present disclosure are not limited thereto, and according to some embodiments, at least one of the first transistor T1, the second transistor T2, the fourth transistor T4, the fifth transistor T5, the sixth transistor T6, the seventh transistor T7, or the eighth transistor T8 may be the NMOS transistor.

The first capacitor C1 may store the signal of the control node Q1 and Q2, and may boost the signal of the second control node Q2 in response to a change in the gate signal GS[k]. According to some embodiments, the first capacitor C1 may include a first terminal connected to the gate output terminal TGO and a second terminal connected to the second control node Q2.

When the fifth transistor T5 is turned on in response to the first low gate voltage VGL of the second control node Q2, the gate signal GS[k] may change from the high gate voltage VGH to the second low gate voltage VGL2, and the signal of the second control node Q2 may be boosted by the first capacitor C1 in proportion to a difference between the second low gate voltage VGL2 and the high gate voltage VGH. Accordingly, when the gate signal GS[k] changes from the high gate voltage VGH to the second low gate voltage VGL2, a voltage having a level lower than the level of the first low gate voltage VGL may be applied to the second control node Q2.

The second capacitor C2 may store the signal of the inverting control node QB. The second capacitor C2 may include a first terminal connected to the inverting control node QB and a second terminal receiving the high gate voltage VGH.

Figure 3:
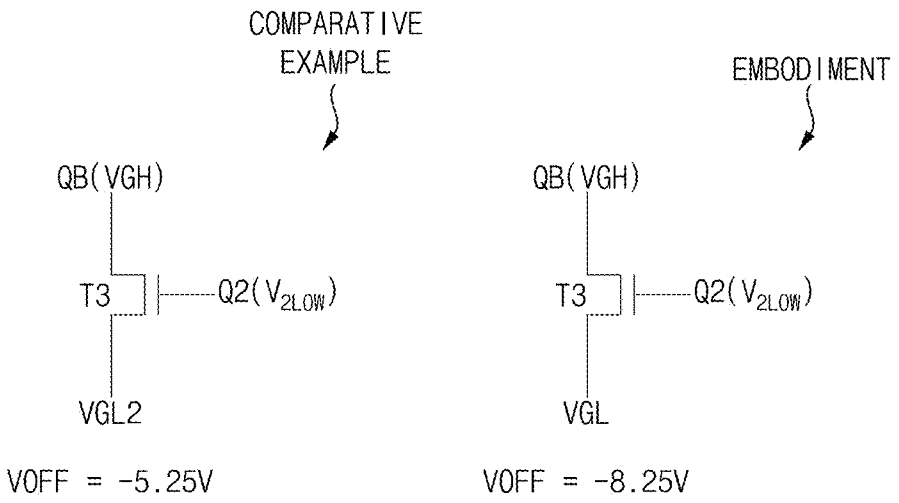
FIG. 3 is a diagram showing an off voltage of a third transistor according to a comparative example and some embodiments.
Figure 4:
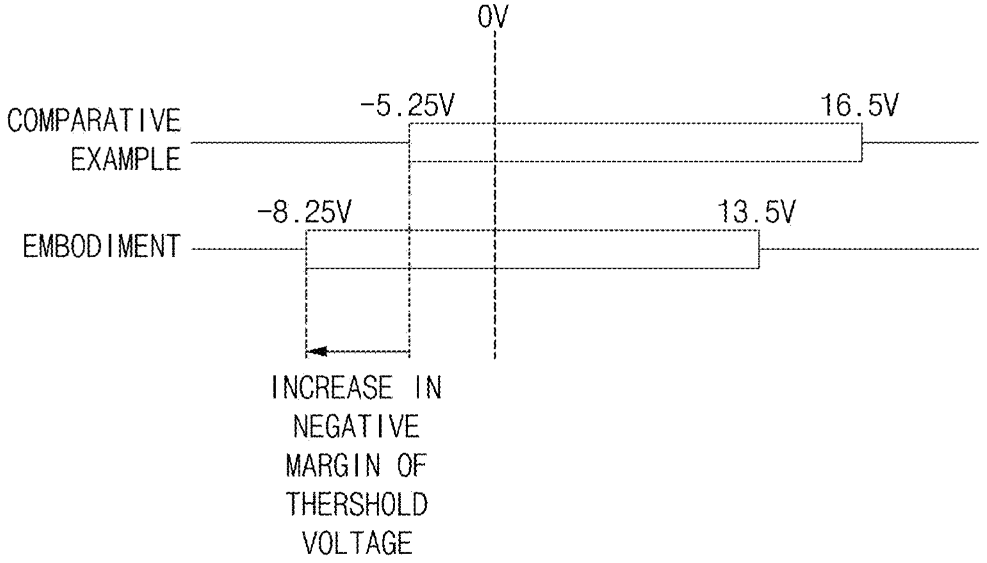
FIG. 4 is a diagram showing a shift margin of a threshold voltage of the third transistor according to a comparative example and some embodiments.

FIG. 3 is a diagram showing an off voltage $V_{OFF}$ of the third transistor T3 according to a comparative example and some embodiments. FIG. 4 is a diagram showing a shift margin of a threshold voltage of the third transistor T3 according to a comparative example and some embodiments.

Referring to FIGS. 2 to 4, when the third transistor T3 is turned off, a low voltage $V_{2LOW}$ may be applied to the gate of the third transistor T3, and the high gate voltage VGH may be applied to the second terminal of the third transistor T3. When the third transistor T3 is turned off, the first low gate voltage VGL may be applied to the second control node Q2, and as the gate signal GS[k] changes from the high gate voltage VGH to the second low gate voltage VGL2, the signal of the second control node Q2 may be boosted by a voltage corresponding to a difference VGL2−VGH between the second low gate voltage VGL2 and the high gate voltage VGH due to a coupling of the first capacitor C1.

When the third transistor T3 is turned off, in the comparative example, the second low gate voltage VGL2 may be applied to the first terminal of the third transistor T3, and according to some embodiments, the first low gate voltage VGL may be applied to the first terminal of the third transistor T3. In the comparative example, the off voltage $V_{OFF}$ of the third transistor T3 may be calculated by Equation 1, and according to some embodiments, the off voltage $V_{OFF}$ of the third transistor T3 may be calculated by Equation 2.

$$V_{OFF} = V_{2LOW} - VGL2 = VGL + k(VGL2 - VGH) - VGL2 \quad \text{Equation 1}$$

$$V_{OFF} = V_{2LOW} - VGL = VGL + k(VGL2 - VGH) - VGL \quad \text{Equation 2}$$

In Equation 1 and Equation 2, k is a coupling coefficient between the first terminal and the second terminal of the first capacitor C1. For example, when the high gate voltage VGH is 6.5V (or about 6.5V), the first low gate voltage VGL is −7V (or about −7V), the second low gate voltage VGL2 is −10V (or about −10V), and the coupling coefficient k is 0.5 (or about 0.5), in the comparative example, the off voltage $V_{OFF}$ of the third transistor T3 may be −5.25V (or about −5.25V), and according to some embodiments, the off voltage $V_{OFF}$ of the third transistor T3 may be −8.25V (or about-8.25V).

When the third transistor T3 is turned on, the high gate voltage VGH may be applied to the gate of the third transistor T3. When the third transistor T3 is turned on, in the comparative example, the second low gate voltage VGL2 may be applied to the first terminal of the third transistor T3, and according to some embodiments, the first low gate voltage VGL may be applied to the first terminal of the third transistor T3. In the comparative example, an on voltage $V_{ON}$ of the third transistor T3 may be calculated by Equation 3, and according to some embodiments, the on voltage $V_{ON}$ of the third transistor T3 may be calculated by the equation 4.

$$V_{ON} = VGH - VGL2 \quad \text{Equation 3}$$

$$V_{ON} = VGH - VGL \quad \text{Equation 4}$$

For example, when the high gate voltage VGH is 6.5V (or about 6.5V), the first low gate voltage VGL is −7V (or about −7V), and the second low gate voltage VGL2 is −10V (or about −10V), in the comparative example, the on voltage $V_{ON}$ of the third transistor T3 may be 16.5V (or about 16.5V), and according to some embodiments, the on voltage $V_{ON}$ of the third transistor T3 may be 13.5V (or about 13.5V).

In the comparative example, as the second low gate voltage VGL2 is applied to the first terminal of the third transistor T3, the off voltage $V_{OFF}$ of the third transistor T3 may be −5.25V (or about −5.25V), and the on voltage $V_{ON}$ of the transistor T3 may be 16.5V (or about 16.5V). Accordingly, a negative margin of the threshold voltage of the third transistor T3 may be less than a positive margin of the threshold voltage of the third transistor T3. Accordingly, in the comparative example, when the threshold voltage of the third transistor T3 is negatively shifted, a leakage current of the third transistor T3 may relatively increase, and the reliability of the gate driver may relatively decrease.

According to some embodiments, as the first low gate voltage VGL is applied to the first terminal of the third transistor T3, the off voltage $V_{OFF}$ of the third transistor T3 may be −8.25V (or about −8.25V), and the on voltage $V_{ON}$ of the transistor T3 may be 13.5V (or about 13.5V). Accordingly, compared to the negative margin of the threshold voltage of the third transistor T3 according to the comparative example, the negative margin of the threshold voltage of the third transistor T3 according to some embodiments may relatively increase, and a sufficient negative margin of the threshold voltage of the third transistor T3 may be secured. Accordingly, according to some embodiments, although the threshold voltage of the third transistor T3 is negatively shifted, the leakage current of the third transistor T3 may not increase, and the reliability of the gate driver 10 may be relatively improved.

Figure 5:
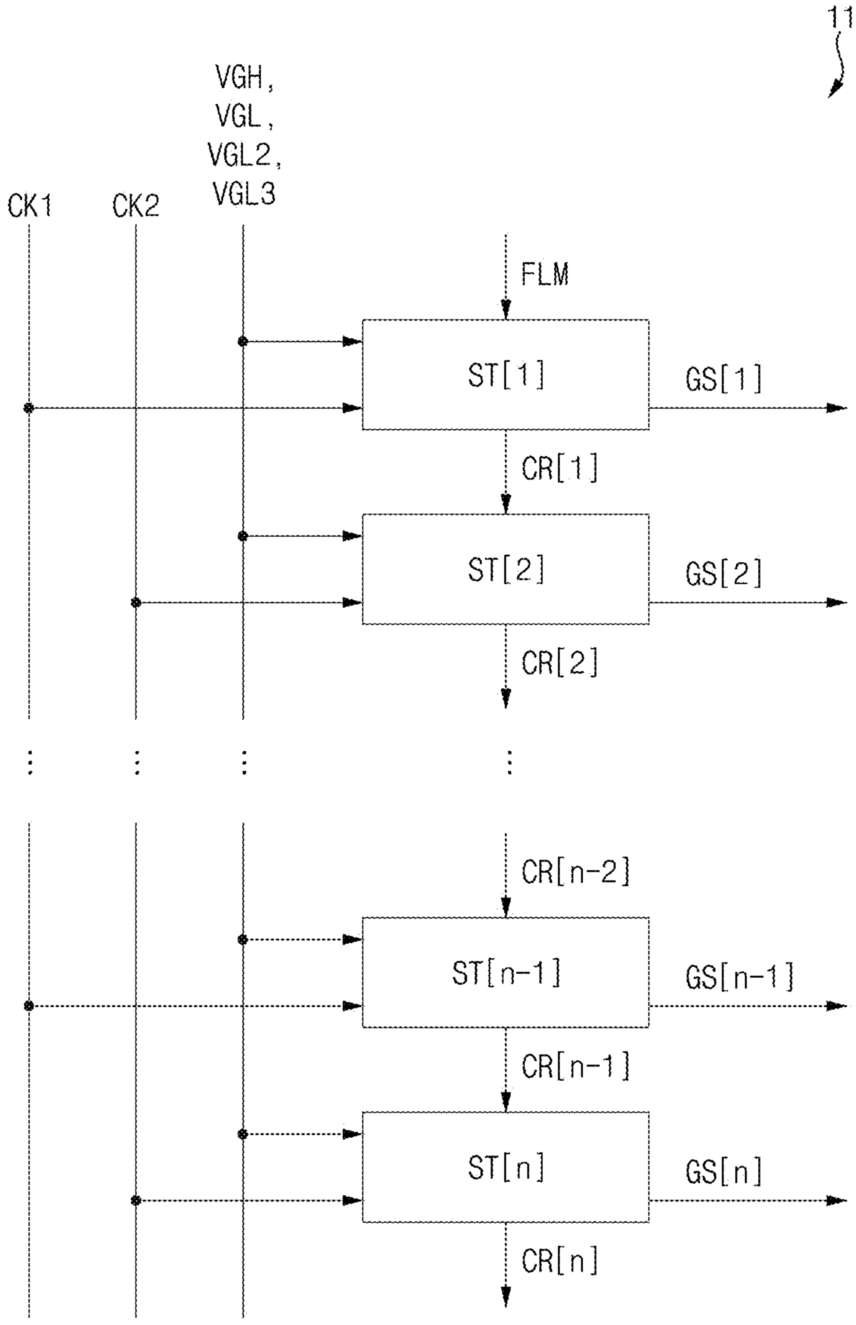
FIG. 5 is a block diagram showing a gate driver according to some embodiments.
Figure 6:
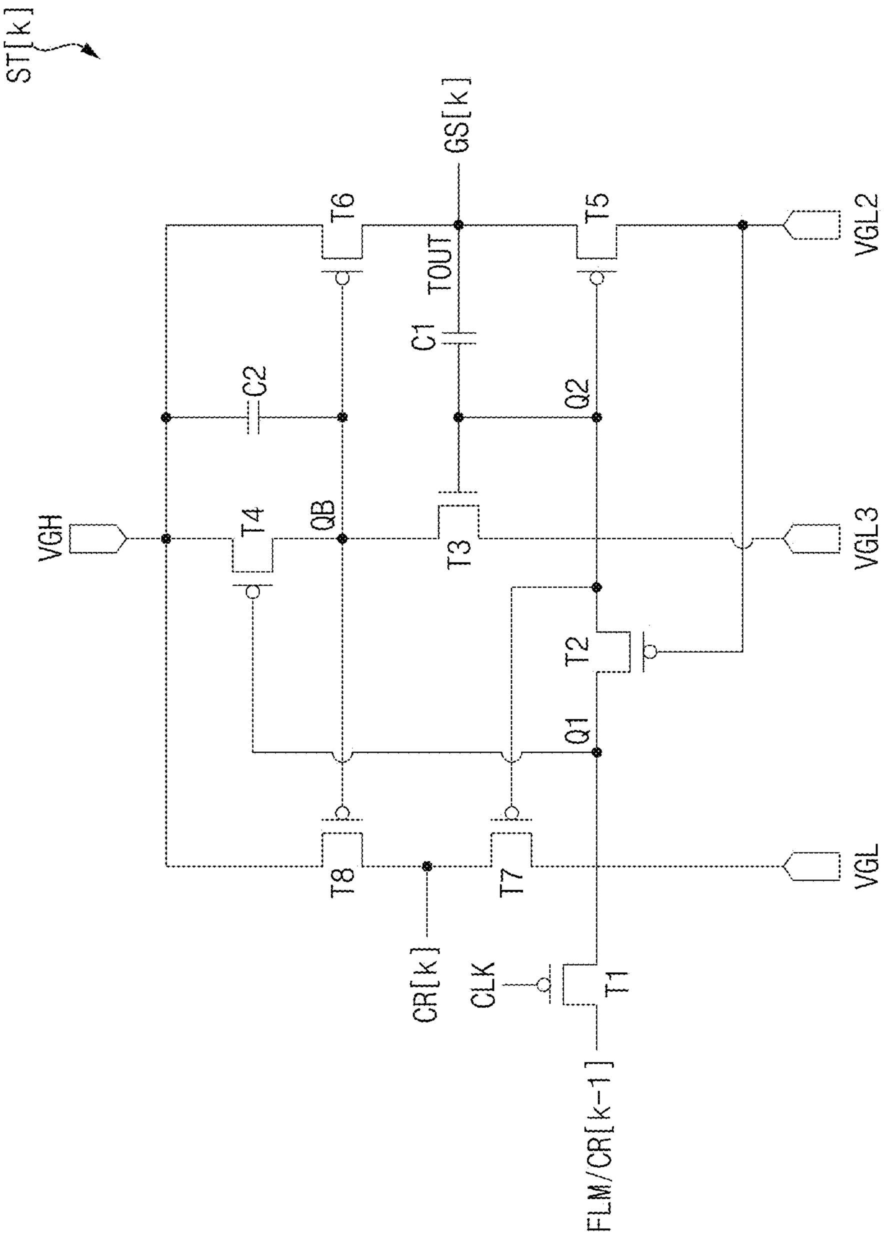
FIG. 6 is a circuit diagram showing a $k^{th}$ stage of FIG. 5.

FIG. 5 is a block diagram showing a gate driver 11 according to some embodiments. FIG. 6 is a circuit diagram showing a $k^{th}$ stage ST[k] of FIG. 5. Although FIG. 6 illustrates various components in a $k^{th}$ stage ST[k] according to some embodiments, embodiments according to the present disclosure are not limited thereto, and according to some embodiments, the $k^{th}$ stage ST[k] may include additional components or fewer components without departing from the spirit and scope of embodiments according to the present disclosure.

Some descriptions of components of the gate driver 11 described with reference to FIGS. 5 and 6, which are the same as or substantially the same as or similar to the gate driver 10 described with reference to FIGS. 1 and 2, may be omitted.

Referring to FIGS. 5 and 6, the gate driver 11 may receive a first clock signal CK1, a second clock signal CK2, a high gate voltage VGH, a first low gate voltage VGL, a second low gate voltage VGL2, a third low gate voltage VGL3, and a gate start signal FLM, and may output first to $n^{th}$ gate signals GS[1], GS[2], . . . , GS[n−1], and GS[n] and first to $n^{th}$ carry signals CR[1], CR[2], . . . , CR[n−1], and CR[n]. The third low gate voltage VGL3 may be a turn-on voltage of a PMOS transistor and a turn-off voltage of an NMOS transistor. A level of the third low gate voltage VGL3 may be different from a level of the first low gate voltage VGL. According to some embodiments, the level of the third low gate voltage VGL3 may be higher than the level of the first low gate voltage VGL. For example, the level of the third low gate voltage VGL3 may be higher than −7V (or about −7V).

The gate driver 11 may include first to $n^{th}$ stages ST[1], ST[2], . . . , ST[n−1], and ST[n]. Each of the first to $n^{th}$ stages ST[1], ST[2], . . . , ST[n−1], and ST[n] may receive the high gate voltage VGH, the first low gate voltage VGL, the second low gate voltage VGL2 and the third low gate voltage VGL3.

The $k^{th}$ stage ST[k] may receive an input signal FLM/CR[k−1], a clock signal CLK, the high gate voltage VGH, the first low gate voltage VGL, the second low gate voltage VGL2, and the third low gate voltage VGL3, and may output a $k^{th}$ gate signal GS[k] and a $k^{th}$ carry signal CR[k].

The third transistor T3 may transmit the power voltage to the inverting control node QB in response to the signal of the control node Q1 and Q2. According to some embodiments, the third transistor T3 may include a gate connected to the second control node Q2, a first terminal receiving the power voltage, and a second terminal connected to the inverting control node QB.

A level of the power voltage may be higher than a level of the second low gate voltage VGL2. According to some embodiments, the power voltage may be the third low gate voltage VGL3.

According to some embodiments, as the third low gate voltage VGL3 is applied to the first terminal of the third transistor T3, compared to the negative margin of the threshold voltage of the third transistor T3 according to the comparative example, the negative margin of the threshold voltage of the third transistor T3 according to some embodiments may relatively increase, and a sufficient negative margin of the threshold voltage of the third transistor T3 may be secured. Accordingly, according to some embodiments, although the threshold voltage of the third transistor T3 is negatively shifted, the leakage current of the third transistor T3 may not increase, and the reliability of the gate driver 11 may be relatively improved.

Figure 7:
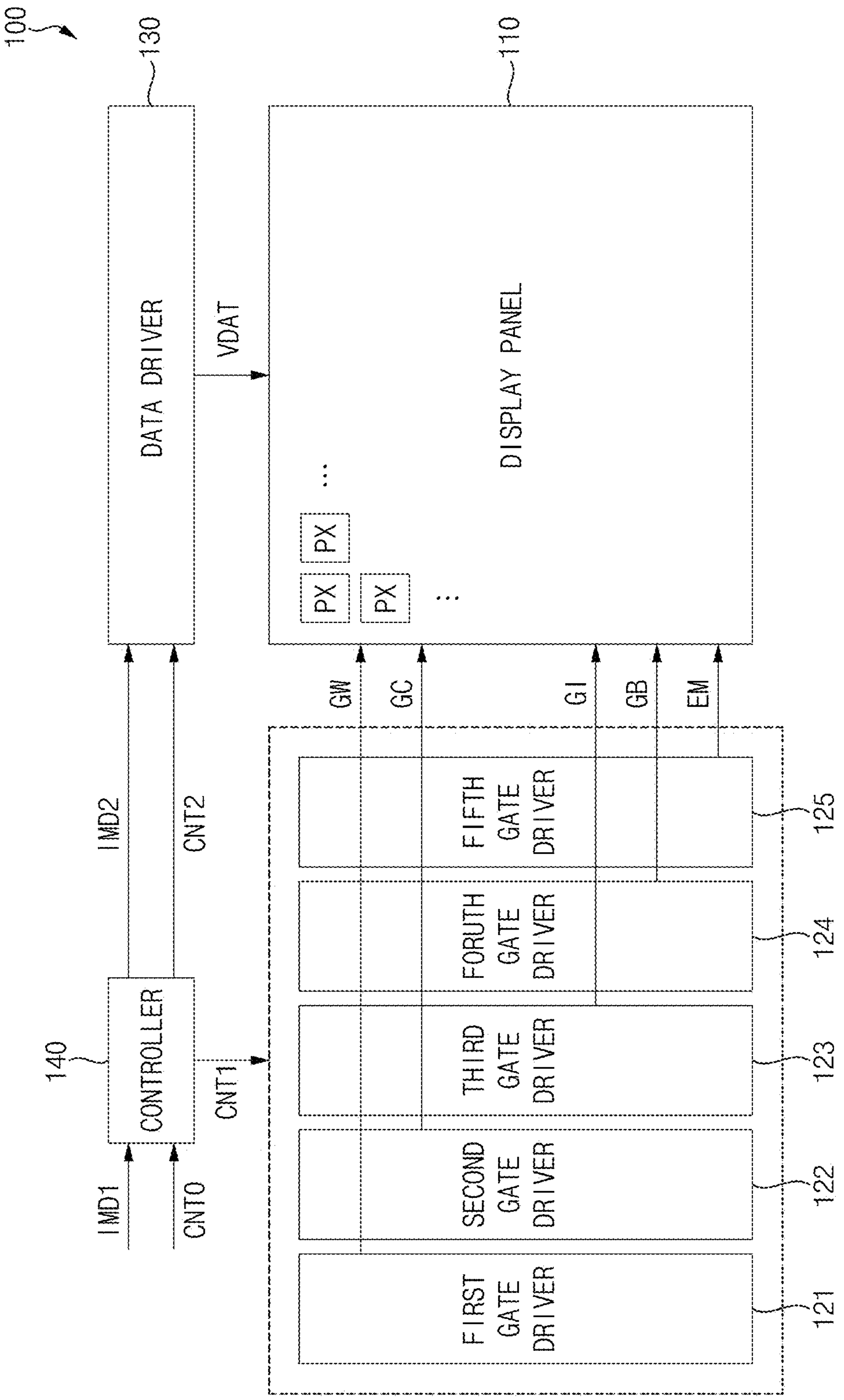
FIG. 7 is a block diagram showing a display device according to some embodiments.

FIG. 7 is a block diagram showing a display device 100 according to some embodiments.

Referring to FIG. 7, the display device 100 may include a display panel 110, a first gate driver 121, a second gate driver 122, a third gate driver 123, a fourth gate driver 124, a fifth gate driver 125, a data driver 130, and a controller 140.

The display panel 110 may include pixels PX. Each of the pixels PX may display an image based on a write gate signal GW, a compensation gate signal GC, an initialization gate signal GI, a bypass gate signal GB, an emission signal EM, and a data voltage VDAT.

The first gate driver 121 may provide the write gate signal GW to each of the pixels PX. The second gate driver 122 may provide the compensation gate signal GC to each of the pixels PX. The third gate driver 123 may provide the initialization gate signal GI to each of the pixels PX. The fourth gate driver 124 may provide the bypass gate signal GB to each of the pixels PX. The fifth gate driver 125 may provide the emission signal EM to each of the pixels PX. The first to fifth gate drivers 121, 122, 123, 124, and 125 may generate the write gate signal GW, the compensation gate signal GC, the initialization gate signal GI, the bypass gate signal GB, and the emission signal EM based on a first control signal CNT1. The first control signal CNT1 may include a gate start signal, a gate clock signal, etc.

According to some embodiments, the gate driver 10 of FIG. 1 and the gate driver 11 of FIG. 5 may correspond to the second gate driver 122. According to some embodiments, the gate driver 10 of FIG. 1 and the gate driver 11 of FIG. 5 may correspond to the third gate driver 123. According to some embodiments, the gate driver 10 of FIG. 1 and the gate driver 11 of FIG. 5 may correspond to the fifth gate driver 125.

FIG. 7 shows embodiments in which the display device 100 includes the first to fifth gate drivers 121, 122, 123, 124, and 125, but embodiments according to the present disclosure are not limited thereto. According to some embodiments, the display device 100 may include a gate driver in which the second gate driver 122 and the third gate driver 123 are integrated.

The data driver 130 may provide the data voltage VDAT to each of the pixels PX. The data driver 130 may generate the data voltage VDAT based on second image data IMD2 and a second control signal CNT2. The second control signal CNT2 may include an output data enable signal, a horizontal start signal, a load signal, etc.

The controller 140 may control operations (or driving) of the first to fifth gate drivers 121, 122, 123, 124, and 125 and an operation (or driving) of the data driver 130. The controller 140 may output the first control signal CNT1 to the first to fifth gate drivers 121, 122, 123, 124, and 125, and may output the second image data IMD2 and the second control signal CNT2 to the data driver 130. The controller 140 may generate the first control signal CNT1, the second image data IMD2, and the second control signal CNT2 based on first image data IMD1 and a control signal CNT0. The control signal CNT0 may include a master clock signal, a vertical start signal, a horizontal start signal, an input data enable signal, etc.

Figure 8:
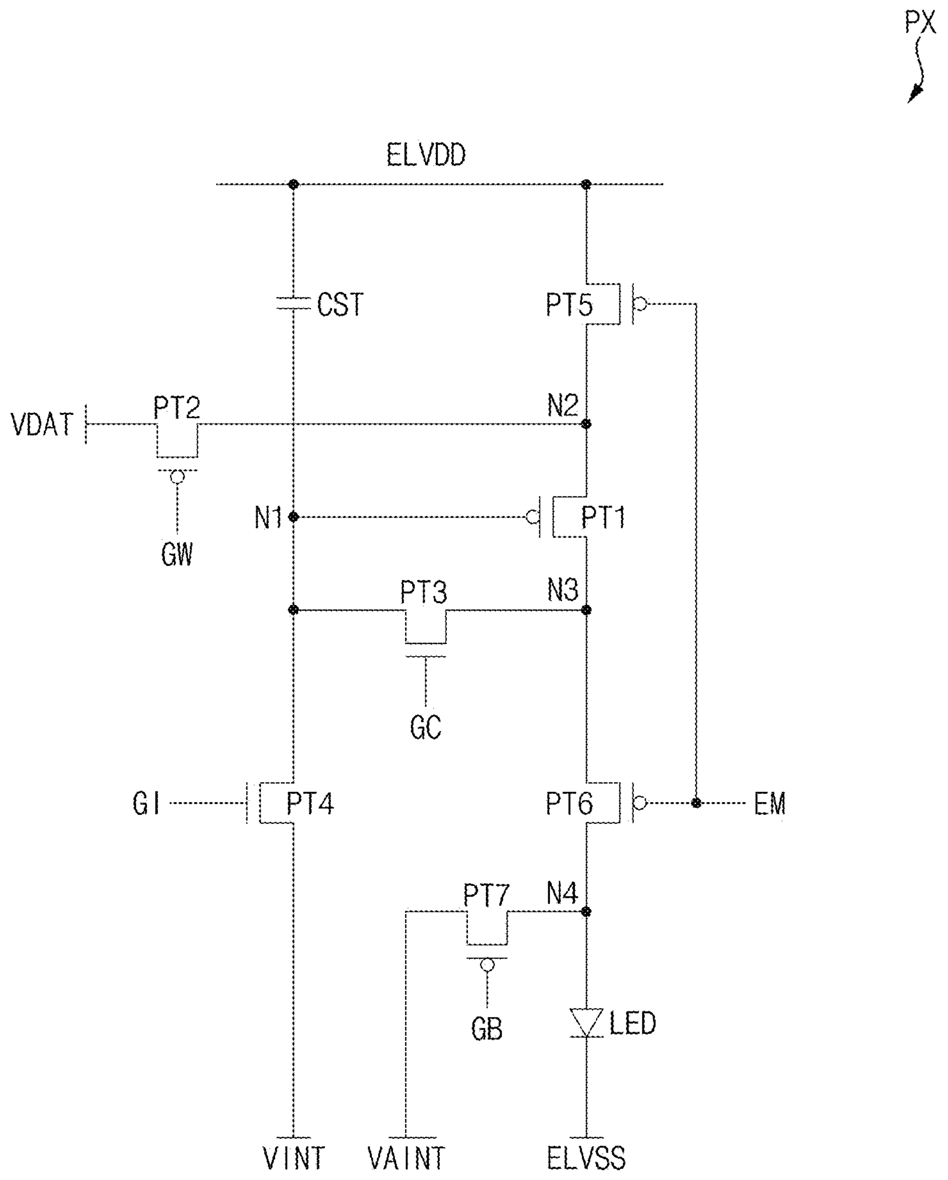
FIG. 8 is a circuit diagram showing an example of a pixel of FIG. 7.

FIG. 8 is a circuit diagram showing an example of the pixel PX of FIG. 7. Although FIG. 8 illustrates various components in a pixel PX according to some embodiments, embodiments according to the present disclosure are not limited thereto, and according to some embodiments, the pixel PX may include additional components or fewer components without departing from the spirit and scope of embodiments according to the present disclosure.

Referring to FIGS. 7 and 8, the pixel PX may receive the write gate signal GW, the compensation gate signal GC, the initialization gate signal GI, the bypass gate signal GB, the emission signal EM, the data voltage VDAT, a first initialization voltage VINT, a second initialization voltage VAINT, a first pixel voltage ELVDD, and a second pixel voltage ELVSS.

The pixel PX may include a light emitting element LED, a first pixel transistor PT1, a second pixel transistor PT2, a third pixel transistor PT3, a fourth pixel transistor PT4, a fifth pixel transistor PT5, a sixth pixel transistor PT6, a seventh pixel transistor PT7, and a storage capacitor CST.

The light emitting element LED may emit light with a luminance corresponding to a driving current. The light emitting element LED may include an anode connected to a fourth node N4 and a cathode receiving the second pixel voltage ELVSS.

The first pixel transistor PT1 may control the driving current flowing through the light emitting element LED. According to some embodiments, the first pixel transistor PT1 may include a gate connected to a first node N1, a first terminal connected to a second node N2, and a second terminal connected to a third node N3. The first pixel transistor PT1 may be referred to as a driving transistor.

The second pixel transistor PT2 may transmit the data voltage VDAT to the gate of the first pixel transistor PT1 in response to the write gate signal GW. According to some embodiments, the second pixel transistor PT2 may include a gate receiving the write gate signal GW, a first terminal receiving the data voltage VDAT, and a second terminal connected to the second node N2. The second pixel transistor PT2 may be referred to as a write transistor.

The third pixel transistor PT3 may compensate a threshold voltage of the first pixel PT1 in response to the compensation gate signal GC. According to some embodiments, the third pixel transistor PT3 may include a gate receiving the compensation gate signal GC, a first terminal connected to the third node N3, and a second terminal connected to the first node N1. The third pixel transistor PT3 may be referred to as a compensation transistor.

The fourth pixel transistor PT4 may transmit the first initialization voltage VINT to the gate of the first pixel transistor PT1 in response to the initialization gate signal GI. According to some embodiments, the fourth pixel transistor PT4 may include a gate receiving the initialization gate signal GI, a first terminal receiving the first initialization voltage VINT, and a second terminal connected to the first node N1. The fourth pixel transistor PT4 may be referred to as an initialization transistor.

The fifth pixel transistor PT5 may block a connection between the first terminal of the first pixel transistor PT1 and the first pixel voltage ELVDD in response to the emission signal EM. According to some embodiments, the fifth pixel transistor PT5 may include a gate receiving the emission signal EM, a first terminal receiving the first pixel voltage ELVDD, and a second terminal connected to the second node N2. The fifth pixel transistor PT5 may be referred to as a first emission transistor.

The sixth pixel transistor PT6 may block a connection between the second terminal of the first pixel transistor PT1 and the second pixel voltage ELVSS in response to the emission signal EM. The sixth pixel transistor PT6 may include a gate receiving the emission signal EM, a first terminal connected to the third node N3, and a second terminal connected to the fourth node N4. The sixth pixel transistor PT6 may be referred to as a second emission transistor.

The seventh pixel transistor PT7 may provide the second initialization voltage VAINT to the anode of the light emitting element LED in response to the bypass gate signal GB. The seventh pixel transistor PT7 may include a gate receiving the bypass gate signal GB, a first terminal receiving the second initialization voltage VAINT, and a second terminal connected to the fourth node N4. The seventh pixel transistor PT7 may be referred to as a bypass transistor.

According to some embodiments, each of the first pixel transistor PT1, the second pixel transistor PT2, the fifth pixel transistor PT5, the sixth pixel transistor PT6, and the seventh pixel transistor PT7 may be a PMOS transistor, and each of the third pixel transistor PT3 and the fourth pixel transistor PT4 may be an NMOS transistor. However, embodiments according to the present disclosure are not limited thereto, and according to some embodiments, each of the third pixel transistor PT3 and the fourth pixel transistor PT4 may be the PMOS transistor.

The storage capacitor CST may store a signal of the gate of the first pixel transistor PT1. The storage capacitor CST may include a first terminal connected to the first node N1 and a second terminal receiving the first pixel voltage ELVDD.

According to some embodiments, the gate signal GS[k] of FIG. 2 and the gate signal GS[k] of FIG. 6 may be the compensation gate signal GC. According to some embodiments, the gate signal GS[k] of FIG. 2 and the gate signal GS[k] of FIG. 6 may be the initialization gate signal GI. According to some embodiments, the gate signal GS[k] of FIG. 2 and the gate signal GS[k] of FIG. 6 may be the emission signal EM.

Figure 9:
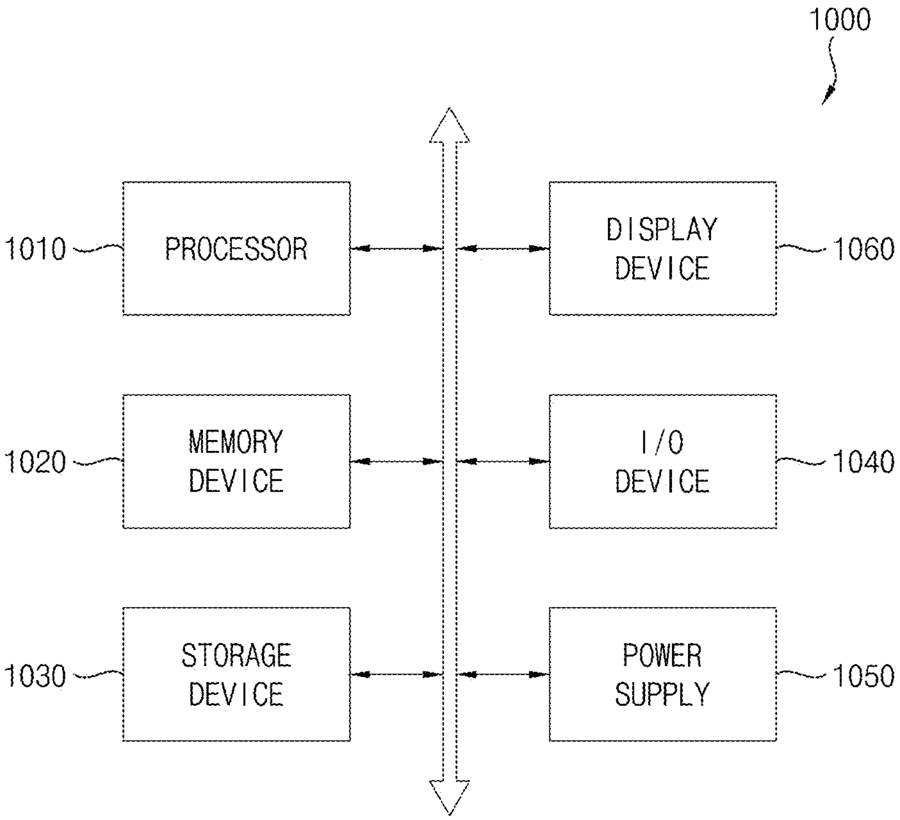
FIG. 9 is a block diagram showing an electronic apparatus according to some embodiments.

FIG. 9 is a block diagram showing an electronic apparatus 1000 according to some embodiments.

Referring to FIG. 9, the electronic apparatus 1000 may include a processor 1010, a memory device 1020, a storage device 1030, an input/output ("I/O") device 1040, a power supply 1050, and a display device 1060. The electronic apparatus 1000 may further include a plurality of ports capable of communicating with a video card, a sound card, a memory card, a USB device, and the like, or communicating with other systems.

The processor 1010 may perform specific calculations or tasks. According to some embodiments, the processor 1010 may be a microprocessor, a central processing unit ("CPU"), or the like. The processor 1010 may be connected to other components through an address bus, a control bus, a data bus, and the like. According to some embodiments, the processor 1010 may also be connected to an expansion bus such as a peripheral component interconnect ("PCI") bus. According to some embodiments, the processor 1010 may provide the first image data IMD1 of FIG. 7 and the control signal CNT0 of FIG. 7 to the display device 1060.

The memory device 1020 may store data required for an operation of the electronic apparatus 1000. For example, the memory device 1020 may include: a nonvolatile memory device such as an erasable programmable read-only memory ("EPROM"), an electrically erasable programmable read-only memory ("EEPROM"), a flash memory, a phase change random access memory ("PRAM"), a resistance random access memory ("RRAM"), a nano floating gate memory ("NFGM"), a polymer random access memory ("PoRAM"), a magnetic random access memory ("MRAM"), or a ferroelectric random access memory ("FRAM"); and/or a volatile memory device such as a dynamic random access memory ("DRAM"), a static random access memory ("SRAM"), or a mobile DRAM.

The storage device 1030 may include a solid state drive ("SSD"), a hard disk drive ("HDD"), a CD-ROM, and the like. The I/O device 1040 may include: an input device such as a keyboard, a keypad, a touch pad, a touch screen, or a mouse; and an output device such as a speaker or a printer. The power supply 1050 may supply a power required for the operation of the electronic apparatus 1000. The display device 1060 may be connected to other components through the buses or other communication links. The display device 1060 may correspond to the display device 100 of FIG. 7.

In a gate driver included in the display device 1060, a power voltage (a first low gate voltage or a third low gate voltage) having a level higher than a level of a second low gate voltage may be applied to a first terminal of a third transistor, so that a negative shift margin of a threshold voltage of the third transistor may relatively increase. Accordingly, a reliability of the gate driver may be relatively improved. Further, the display device 1060 may include the gate driver with relatively improved reliability, so that a display quality of the display device 1060 may be relatively improved.

The display device according to the embodiments may be applied to a display device included in a computer, a notebook, a mobile phone, a smart phone, a smart pad, a smart watch, a PMP, a PDA, an MP3 player, or the like.

Although aspects of gate drivers and display devices according to some embodiments have been described with reference to the drawings, the illustrated embodiments are examples, and may be modified and changed by a person having ordinary knowledge in the relevant technical field without departing from the technical spirit described in the appended claims, and their equivalents.

What is claimed is:

1. A gate driver, comprising:

a first transistor configured to transmit an input signal to a control node; a third transistor including a gate connected to the control node, a first terminal configured to receive a power voltage having a level higher than a level of a second low gate voltage, and a second terminal connected to an inverting control node;

a fifth transistor having a gate connected to the control node and configured to output the second low gate voltage as a gate signal in response to a signal of the control node;

a sixth transistor configured to output a high gate voltage as the gate signal in response to a signal of the inverting control node;

a seventh transistor configured to output a first low gate voltage having a level higher than the level of the second low gate voltage as a carry signal in response to the signal of the control node; and an eighth transistor configured to output the high gate voltage as the carry signal in response to the signal of the inverting control node.

2. The gate driver of claim 1, wherein the power voltage is the first low gate voltage.

3. The gate driver of claim 1, wherein the power voltage is a third low gate voltage having a level different from the level of the first low gate voltage.

4. The gate driver of claim 3, wherein the level of the third low gate voltage is higher than the level of the first low gate voltage.

5. The gate driver of claim 1, wherein the third transistor is an NMOS transistor.

6. The gate driver of claim 1, wherein the first transistor includes a gate configured to receive a clock signal, a first terminal configured to receive the input signal, and a second terminal connected to the control node.

7. The gate driver of claim 1, further comprising:

a fourth transistor including a gate connected to the control node, a first terminal configured to receive the high gate voltage, and a second terminal connected to the inverting control node.

8. The gate driver of claim 1, further comprising:

a second transistor including a gate configured to receive the second low gate voltage, a first terminal connected to a first control node, and a second terminal connected to a second control node, wherein the control node is divided into the first control node and the second control node.

9. The gate driver of claim 1, further comprising:

a first capacitor including a first terminal connected to a gate output terminal configured to output the gate signal and a second terminal connected to the control node.

10. The gate driver of claim 1, further comprising:

a second capacitor including a first terminal connected to the inverting control node and a second terminal configured to receive the high gate voltage.

11. A display device, comprising:

a display panel including a plurality of pixels;

a gate driver configured to provide a gate signal to each of the pixels; and a data driver configured to provide a data voltage to each of the pixels, wherein the gate driver includes: a first transistor configured to transmit an input signal to a control node;

a third transistor including a gate connected to the control node, a first terminal configured to receive a power voltage having a level higher than a level of a second low gate voltage, and a second terminal connected to an inverting control node;

a fifth transistor having a gate connected to the control node and configured to output the second low gate voltage as the gate signal in response to a signal of the control node;

a sixth transistor configured to output a high gate voltage as the gate signal in response to a signal of the inverting control node;

a seventh transistor configured to output a first low gate voltage having a level higher than the level of the second low gate voltage as a carry signal in response to the signal of the control node; and an eighth transistor configured to output the high gate voltage as the carry signal in response to the signal of the inverting control node.

12. The display device of claim 11, wherein the power voltage is the first low gate voltage.

13. The display device of claim 11, wherein the power voltage is a third low gate voltage having a level different from the level of the first low gate voltage.

14. The display device of claim 11, wherein the third transistor is an NMOS transistor.

15. The display device of claim 11, wherein each of the pixels includes:

a light emitting element;

a first pixel transistor configured to control a driving current flowing through the light emitting element;

a second pixel transistor configured to transmit the data voltage to a gate of the first pixel transistor in response to a write gate signal;

a third pixel transistor configured to compensate a threshold voltage of the first pixel transistor in response to a compensation gate signal;

a fourth pixel transistor configured to transmit a first initialization voltage to the gate of the first pixel transistor in response to an initialization gate signal;

a fifth pixel transistor configured to block a connection between a first terminal of the first pixel transistor and a first pixel voltage in response to an emission signal;

a sixth pixel transistor configured to block a connection between a second terminal of the first pixel transistor and a second pixel voltage in response to the emission signal;

a seventh pixel transistor configured to provide a second initialization voltage to an anode of the light emitting element in response to a bypass gate signal; and a storage capacitor configured to store a signal of the gate of the first pixel transistor.

16. The display device of claim 15, wherein the gate signal is the compensation gate signal.

17. The display device of claim 15, wherein the gate signal is the initialization gate signal.

18. The display device of claim 15, wherein the gate signal is the emission signal.

* * * * *